United States Patent Office 2,842,763
Patented July 8, 1958

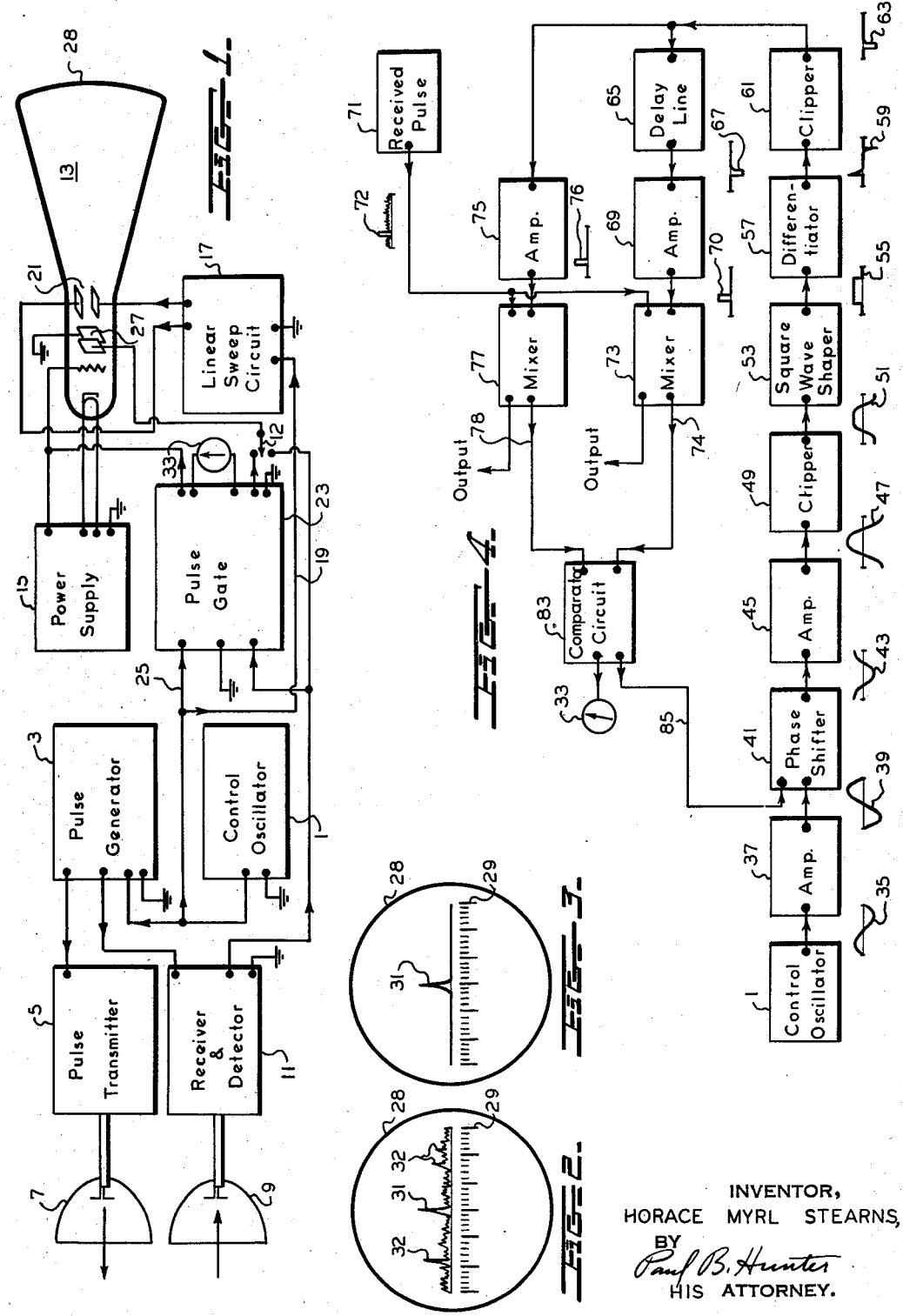

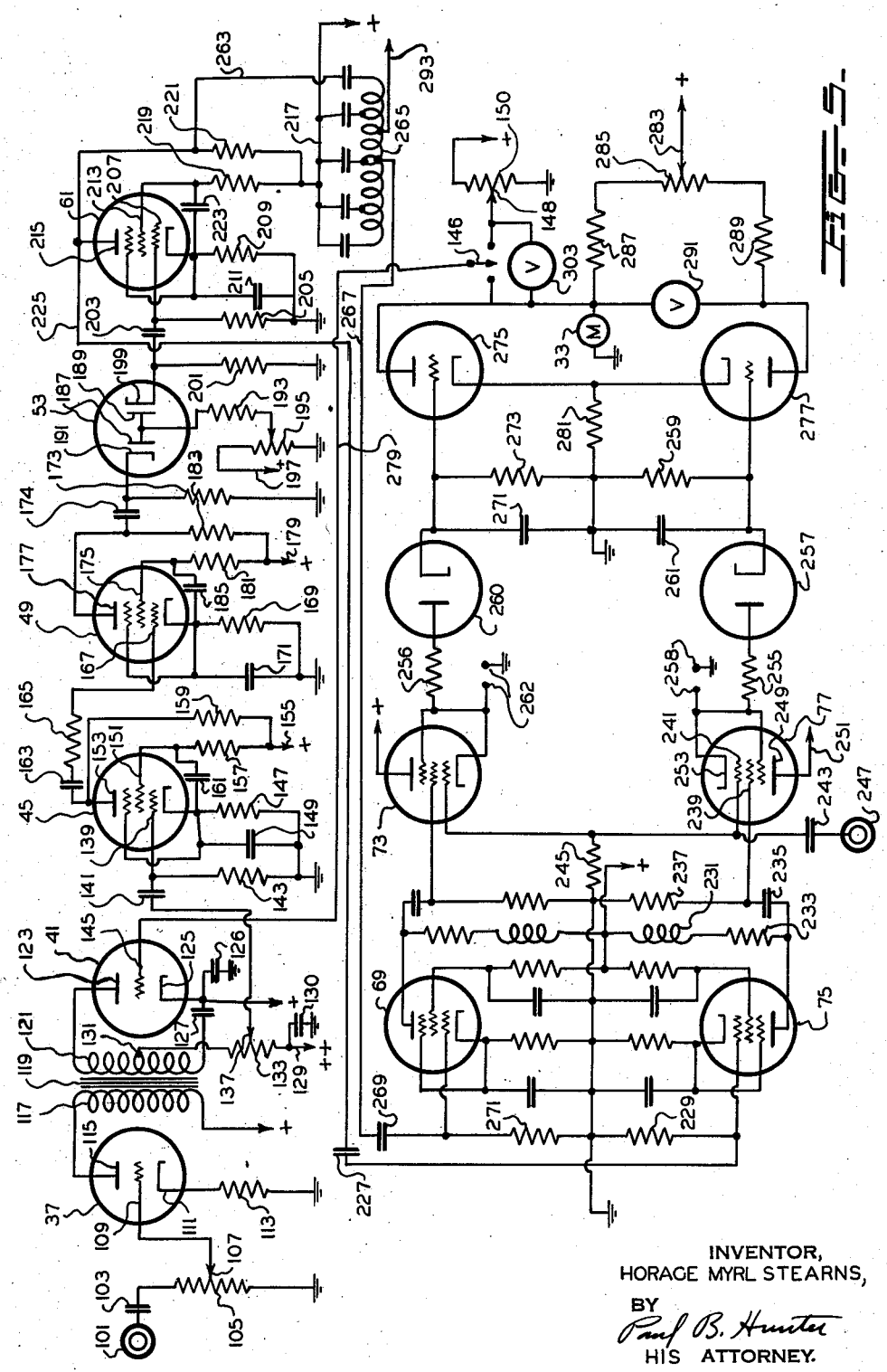

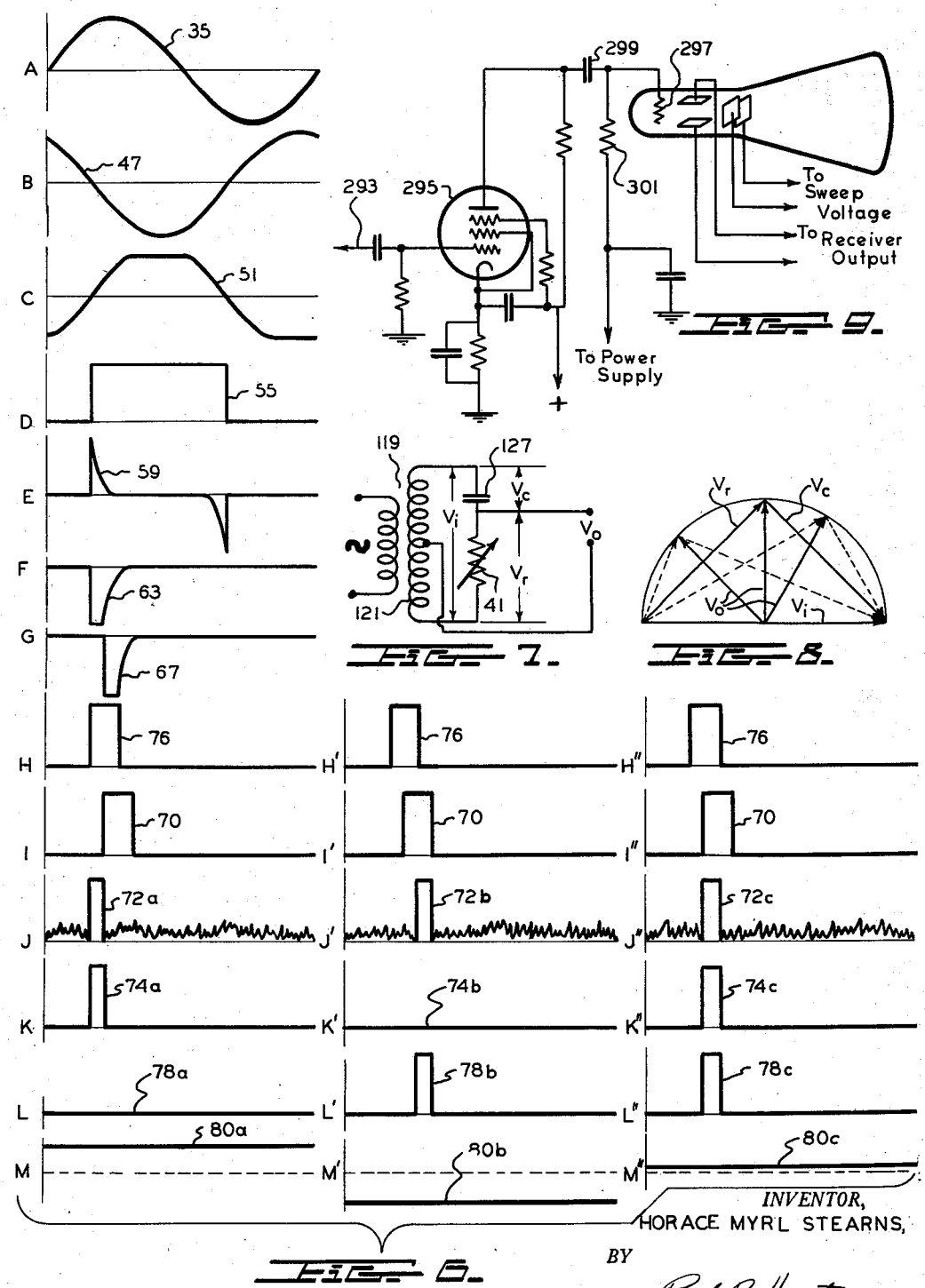

2,842,763
PULSE RECEIVING SYSTEMS

Horace Myrl Stearns, Baldwin, N. Y., assignor to Sperry Rand Corporation, a corporation of Delaware Application March 12, 1942, Serial No. 434,403

2 Claims. (Cl. 343—13)

The present invention relates to improvements in pulse receiving circuits. In many types of present-day systems, accurate indications depend upon the proper reception of periodic short pulses of electromagnetic radiant energy. Examples of such systems are: the reflected-pulse types of radio altimeter, reflecting pulse object detectors, impulse-type direction finding systems, etc. In each of these systems, an important problem which has to be overcome is that of "noise," which may be defined as extraneous received currents other than the desired received pulse, such as are due to atmospherics and stray reflections. Also, where several reflected pulses are obtained, as by multiple reflections or several reflecting objects, it is necessary to distinguish between several pulses.

By the present invention, the harmful effect of such "noise" and extraneous pulses is reduced considerably and substantially eliminated. This is done by the provision of a "pulse gate" which permits the passage of the desired pulse, but prevents the passage of the undesired noise or other pulses accompanying the desired pulse. Such a gate is adjusted in width whereby it may transmit pulses of a desired duration, and is also made to automatically follow the desired received pulse should the phase of the pulse in its recurrence period be changing.

One desirable application of such a device is in a reflected-pulse type of object detector and distance measuring device, with respect to which the invention will be described in the present application.

Accordingly, it is an object of the present invention to provide improved pulse receiving circuits in which the harmful effects of "noise" and extraneous pulses may be eliminated.

It is another object of the present invention to provide an improved pulse gate for pulse receiving systems which will act to pass the desired received pulse and eliminate all extraneous pulses and noise.

It is a further object of the present invention to provide an improved automatic pulse gate for pulse receiving systems which will automatically follow the received pulse even should the pulse change its relative phase position.

It is still a further object of the present invention to provide an improved pulse gate for pulse receiving systems which may be selected to cooperate with pulses of any duration.

Further objects and advantages of the present system will be apparent from the attached specification and drawings in which, Fig. 1 shows a block wiring diagram of a distance measuring system employing the novel pulse gate of the present invention.

Figs. 2 and 3 show representative indications derived from the system of Fig. 1.

Fig. 4 shows a detailed block wiring diagram of the novel pulse gate.

Fig. 5 shows a schematic wiring diagram corresponding to the block diagram of Fig. 4.

Fig. 6 shows various wave shapes existing in various portions of the system and useful in explaining the operation of the system.

Fig. 7 shows the equivalent circuit diagram of the variable phase shifter of Fig. 1.

Fig. 8 is a vector diagram useful in explaining the circuit of Fig. 7.

Fig. 9 shows a portion of the circuit of the cathode ray indicator of Fig. 1.

Referring to Fig. 1, the present invention is disclosed as employed in a reflected-pulse type of distance measuring device, although it is to be noted that the invention is in no way restricted to such a system but may be generally employed in any type of pulse-receiving system, the present system being shown for illustrative purposes only.

In this system, a control oscillator 1 provides a voltage of a suitable synchronizing and control frequency which may be in the audio frequency range, such as, for example, 2,000 cycles per second. This oscillator may be of any type well known in the art. Its output is connected to a pulse generator 3 which converts the oscillations fed to it from oscillator 1 into a recurrent sequence of pulses of any desired shape, magnitude, and duration, having a repetition rate equal to the frequency of oscillator 1, with the duration preferably being very short with respect to the period of oscillations of oscillator 1, such as, for example, of the order of one micro-second. In the present illustrative example these pulses will be assumed to be rectangular in shape, although they need not be so limited. Circuits for producing such pulses are well known in the art and their details form no part of the present invention.

The output of pulse generator 3 is fed to a high frequency transmitter and modulator 5 to produce in its output a recurring sequence of periodic pulses of high frequency energy having a frequency equal to the carrier frequency of the transmitter 5 and a repetition rate equal to the frequency of oscillator 1. These pulses of high frequency energy are fed to a suitable highly directional radiating system 7 whereby they are directed toward the object whose distance is to be measured, which, for example, may be the earth when the device is carried in an airplane, or may be any other desired distant object.

These recurring high frequency pulses will be reflected from the distant object, and the reflected wave may be received by a suitable receiving arrangement 9, and fed to a receiver and detector 11, whose output will then represent the modulation envelope of the received wave. As is well known, due to the elapsed time in travelling from the transmitting radiating system 7 to the reflecting distant object and back to the receiving system 9, the received pulses will be slightly delayed in time with respect to the corresponding transmitted pulses, and this time delay gives a measure of the distance to the distant object.

Fig. 1 shows one type of indicator for indicating this elapsed time and thereby the desired distance. Thus a cathode ray tube 13 is provided whose beam forming and accelerating elements are supplied from a suitable power supply 15. Linear sweep voltages synchronized with oscillator 1, and therefore synchronized with the transmitted pulses, are derived in a suitable conventional linear sweep circuit 17, synchronized with oscillator 1 as over lead 19. This sweep voltage is impressed across one pair of deflecting plates 21 of the cathode ray tube 13.

The received and detected wave output from receiver 11 is fed to the pulse gate of the present invention, represented by block 23, together with a wave derived as by way of lead 25, from control oscillator 1. As described below, pulse gate 23 serves to separate the desired received pulses from the noise, and to transmit only the received pulses. The output of pulse gate 23 is then impressed across the second pair of deflecting plates 27 of the cathode ray tube 13 through a suitable switch 12 when in the "up" position.

As shown in Figs. 2 and 3, the cathode ray tube 13 may have its screen provided with a suitable scale 29 extending in the deflection direction of deflecting plates 21, for example horizontally, which scale may be suitably calibrated in terms of reflection time or distance, as desired. Thus, as each pulse is transmitted from radiator 7 the horizontal sweep of the cathode ray tube is initiated. At the moment the received pulse arrives in receiving arrangement 9, it is impressed upon the other set, for example vertical, deflecting plates 27, and therefore appears as a vertical pulse 31 upon the screen. The position of this pulse with respect to the scale 29 gives an indication of the distance to the distant object.

As shown in Fig. 2, if the pulse gate 23 were not used, as with switch 12 in the "down" position, the vertical deflection of the cathode ray beam would be quite erratic due to noise and other pulses such as 32, which might obscure or render ambiguous the indication upon the screen. However, by the use of the present invention, the pulse gate 23 blocks out substantially all the noise and extraneous pulses of random repetition rate from the indication, leaving only the desired received pulse 31, as shown in Fig. 3, and thereby providing a clear and unambiguous indication. A suitable indicator 33 may also be connected to the output of pulse gate 23 from which also, as will be seen, the required distance may be read off directly.

Fig. 4 shows a schematic block diagram of pulse gate 23 of Fig. 1. Thus, the control oscillator 1 providing an output voltage having, for example, the wave shape illustrated at 35 (see also Fig. 6), is fed through a suitable amplifier 37 whose output has a similar wave shape 39 and energizes the electronic phase shifter circuit 41 to be presently described. As will be seen, phase shifter 41 may be controlled by any suitable uni-directional voltage, and acts to produce an output wave such as 43 similar in shape to wave 39 but phase shifted by a controlled amount substantially proportional to the control voltage. This wave 43 is again amplified in amplifier 45, and produces a wave output, such as 47, which is fed to a clipper circuit 49 serving to cut off the peaks of the wave, leaving a wave shape such as 51. This wave 51 is then fed to a square wave shaper 53, thereby producing in its output a square wave shown as 55, which is fed to a differentiating circuit 57 responsive to the rate of change of the wave 55, from which is obtained the wave shape 59, consisting of positive and negative pulses corresponding to the steep slopes of the square wave 55. Wave 59 is passed through a suitable clipper-inverter 61 which eliminates the negative pulses of the wave 59 and produces only negative pulses 63 corresponding to the positive pulses of wave 59. By suitably adjusting the amplification of any of the preceding stages, the duration of each of the pulses 63 may be adjusted to any desired value. Preferably, these pulses 63 are adjusted to have a duration slightly longer than that of the received pulses, for reasons which will be apparent from the description following. In the illustration used, two micro-seconds would be a suitable duration.

The wave 63 is fed to a delay line 65 which produces in its output a wave such as 67 similar in shape to wave 63 but delayed a predetermined time with respect thereto. Preferably this delay is chosen to have a value such that the delayed pulse 67 and original pulse 63 are coexistent for a period equal to the duration of the received pulse, namely, one micro-second, but may be selected to correspond to any desired gate passing range. Wave 67 is amplified in amplifier 69 to give wave 70 and is then combined with the received wave indicated schematically at 72 in a mixer circuit 73 which is rendered conductive only during the duration of the pulse of wave 70.

The wave 63 is also fed directly to an amplifier 75 to obtain wave 76, which is combined in a mixer 77, similar to mixer 73, with the received pulse 72, the output of mixer 77 also being blocked except during the duration of pulse 76.

The outputs of mixers 73 and 77 are combined in a comparator circuit 83 to be later described, which controls the indication of indicator 33, which, by suitable calibration, may indicate directly the distance measured. The output of circuit 83 is also led to the input of phase shifter 41 as by a lead 85 and serves to control the amount of its phase shift. As has been observed, the phase position of pulse 63 in comparison to the wave of control oscillator 1 and the transmitted pulse is dependent upon the phase shift produced in phase shifter 41. This phase shift is automatically adjusted so that the overlap of pulses 70 and 76 coincides with received pulse 72. When this condition obtains, the system is in equilibrium and the indication of meter 33 or of the cathode ray tube 13 will give the distance measured.

As will be later seen, if this equilibrium condition does not exist, the circuit will automatically readjust itself to cause this equilibrium condition to occur. In this manner, an automatic pulse gate is provided which automatically follows the received pulse and permits the transmission only of the pulse, while blocking substantially all the accompanying noise.

A detailed circuit diagram corresponding to the block diagram of Fig. 4 is shown in Fig. 5. The output of control oscillator 1 is fed to the input of amplifier 37 as by way of terminal 101, coupling condenser 103, and amplitude-adjusting potentiometer 105, whose variable tap 107 is connected to the input grid 109 of amplifier 37. The cathode 111 of amplifier 37 is grounded through a suitable cathode biasing resistor 113, and its anode 115 is connected to a suitable source of positive potential through the primary winding 117 of the transformer 119. If desired, a suitable by-pass condenser may be shunted across biasing resistor 113, but this is not necessary since the main function of amplifier 37 is as a buffer amplifier, and its distortion and amplification are not material. It is to be noted that, although shown as a triode, amplifier 37 may be of any desired type known in the art.

The secondary winding 121 of transformer 119 has one terminal connected to the anode 123 of the phase shifter tube 41 and its other terminal connected to the cathode 125 through a suitable condenser 127. Anode 123 is also connected to a source of high positive potential through the upper half of secondary winding 121, center-tap 131, output potentiometer 133 having high resistance, and lead 129. Cathode 125 is by-passed to ground for alternating current by by-pass condenser 126, and is connected to a source of positive potential lower than that of lead 129 but high enough to prevent grid 145 from being positive with respect to cathode 125, as will later be described. The high potential end of potentiometer 133 is also by-passed to ground for alternating current by condenser 130. Movable tap 137 of potentiometer 133 is connected to the input grid 139 of amplifier 45 by way of a suitable coupling condenser 141 and grid coupling resistor 143.

Phase shifter 41 therefore in effect constitutes a series circuit comprising the secondary winding 121, condenser 127 and the internal resistance of the tube 41, as shown schematically in Fig. 7. As is well known, the internal resistance of tube 41 may be varied by varying the potential on its grid 145. Hence tube 41 has been represented as a variable resistance. Transformer 119 is selected to have a high step-down ratio so that its secondary 121 represents a low impedance compared to those of tube 41 and condenser 127, and hence may be neglected.

Effectively, therefore, the circuit comprises series-connected capacitance and variable resistance.

The vector diagram for this circuit is shown in Fig. 8. If the input voltage, which is the voltage induced in secondary 121, is assumed constant and represented by $V_i$, it will be clear that is must equal the vector sum of the volt-drops across condenser 127 and tube 41, which may be represented by $V_c$ and $V_r$, respectively. Since the same current flows through both the capacitance and resistance, these volt-drops will be in quadrature. Hence, as the resistance varies, the terminus of vector $V_r$ must describe a semi-circle. The output voltage is the difference in potential between the midpoint of $V_i$ and the terminus of $V_r$, and is shown as $V_o$. Clearly $V_o$ will remain substantially of constant magnitude and will vary in phase as tube 41 varies in resistance. In this way a phase shift of about 175° may be easily obtained with substantially linear variation with respect to grid voltage.

The circuit of tube 41 therefore provides an adjustable phase-shifting arrangement under the control of the potential applied to grid 145. If manual control of the pulse gate is desired, this control may be obtained by a suitable manual control of the voltage on the grid 145. Such a manual control is shown in Fig. 5. Thus, with switch 146 in the right-hand position, grid 145 is connected to variable tap 148 of a potentiometer 150 operating as a voltage divider to impress an adjustable positive potential on grid 145 under control of tap 148. It is to be noted that the maximum potential of grid 145 should be less than that of cathode 125, so that no grid current will flow. Hence, by adjusting potentiometer 150, the phase shift of tube 41 may be suitably controlled. However, as described above, it is preferable to provide an automatic control of this phase shift, which will be later described.

Amplifier 45 constitutes a conventional pentode amplifier circuit provided with the usual cathode biasing resistor 147 and by-pass condenser 149 and whose screen grid 151 and anode 153 are energized from the source of positive potential through lead 155 and respective resistors 157 and 159. A by-pass condenser 161 for screen grid 151 is also provided. Any other type of amplifier may be used here.

The output of amplifier 45 is connected to the clipper 49 by way of blocking condenser 163 and a series grid resistor 165. As is well known, the series grid resistor 165 connected to the input grid 167 operates to suppress, or "clip-off", the positive peaks of the input wave. In addition, the bias upon control grid 167, as obtained from cathode biasing resistor 169 and by-pass condenser 171, is selected so that the negative peaks of the input wave are also clipped off, resulting in an output voltage having the character and wave shape shown at 51 in Fig. 4, which is fed to input resistor 173 of wave shaper 53 through a blocking and coupling condenser 174.

Clipper tube 49 has a screen grid 175 and an anode 177 which are energized from the source of positive potential by way of lead 179 and respective resistors 181 and 183. The usual screen grid by-pass condenser 185 is also provided. Clipped wave 51 is then fed to the square wave shaper 53 comprising a pair of diodes or diode sections having their anodes 187 and 189 connected together and, through a suitable resistor 193 and adjustable source of positive potential, to ground, the potential being obtained by means of potentiometer 195 which is connected to the source of positive potential, as by lead 197, and to ground. Cathode 191 is connected directly to the high potential terminal of resistor 173 while cathode 199 is connected to ground through a suitable resistor 201. Tube 53 and its associated circuit elements act as a square wave shaper producing across resistor 201 a voltage having the wave shape shown at 55 in Fig. 4 and a magnitude under the control of potentiometer 195.

This square wave voltage is fed to a differentiating circuit comprising a condenser 203 and a resistor 205 connected to the input grid 207 of clipper tube 61. The values of condenser 203 and resistor 205 are so chosen that, in a manner well known, the voltage appearing across resistor 205 has a wave shape which is substantially the time derivative of the wave shape 55; that is, it will have the wave shape 59.

Clipper tube 61 is shown as a conventional amplifier tube, but its control grid bias obtained from cathode biasing resistor 209 and by-pass condenser 211 is selected to have such a value as to suppress the negative peaks of the wave 59. Clipper 61 has a screen grid 213 and an anode 215 which are energized in conventional manner from a source of positive potential by way of lead 217 through respective resistors 219 and 221, the usual screen grid by-pass condenser 223 being also provided.

The output of clipper 61, having wave shape 63 formed of pulses of suitable duration, as described above, is connected directly, as by lead 225, coupling condenser 227, and input resistor 229, to the amplifier 75 which is illustrated as being of the conventional pentode type similar to amplifier 49. The output impedance of amplifier 75 is composed of a coil 231 in series with a resistor 233 and thereby acts to maintain the high frequency components of the pulse 76 transmitted by amplifier 75 at a proper level. This pulse 76 is then transmitted by way of a coupling condenser 235 and coupling resistor 237 to the screen grid 239 of the mixer pentode tube 77 whose control grid 241 is connected, as by way of a coupling condenser 243 and a coupling resistor 245, to the output of receiver and detector 11, at terminal 247. The anode 249 of mixer 77 is connected directly to the source of positive potential as by lead 251. The cathode 253 of mixer 77 is connected to ground through resistor 255, diode rectifier 257 and resistor 259, suitably by-passed by a condenser 261.

The clipped output 63 of clipper 61 is also connected, as by a lead 263, to a suitable time delay line 265, which may be of the type shown in copending application Serial No. 414,928, for Electrical Time Delay Line, filed October 4, 1941, in the name of Gereld L. Tawney. As is there described, this line acts to suitably delay an input pulse without substantially changing its wave shape. Thus, the output of time delay line 265 appearing on lead 267 will have the wave shape shown at 67 in Fig. 4, but delayed by a time interval such that pulses 67 and 63 will overlap for the duration of a received pulse, such as one micro-second. This pulse 67 is fed through a coupling condenser 269 and a coupling resistor 271 to amplifier 69 whose circuit is substantially the same as that of amplifier 75. The output pulse 70 of amplifier 69 is led in a similar fashion to mixer 73 where pulse 70 is mixed with the received pulse 72, in a fashion similar to the operation of mixer 77.

Resistor 259 and condenser 261 serve to integrate the cathode current of mixer 77, producing a voltage substantially proportional to the average value of this cathode current. The time constant of resistor 259 and condenser 261 is made as high as is consistent with proper loading of mixer 77. Diode 257 provides a low resistance to the charging current for condenser 261, and a high resistance to its discharge, whereby the voltage across condenser 261 is better maintained. Diode 257 also provides a high impedance across output terminals 258 which, as will be seen, may lead to the indicator 13.

Mixer 73 is provided with an exactly similar circuit comprising resistor 256, diode 260, resistor 273, condenser 271 and output terminals 262.

The unidirectional voltages appearing across condensers 271 and 261 are led directly to the respective inputs of direct current amplifiers 275 and 277, which may be of any suitable type, being illustrated as being triodes. Amplifiers 275 and 277 have their cathodes connected to ground through a suitable common biasing resistor 281, and have their anodes connected to a source of positive potential through a lead 283, balancing potentiometer 285, and respective output resistors 287 and 289. Connected between their anodes is a suitable voltmeter 291 which indicates the unbalance voltage there existing.

A second terminal of switch 146 is connected to the anode of either one of the two amplifiers 275 and 277, illustrated in the drawings as being 275. In this way, in the left-hand position of switch 146, the anode voltage of amplifier 275 is impressed on grid 146 of phase shifter 41 to control the phase shift thereof, in the manner already described, for the purpose stated below. A suitable indicator 33 may indicate this control voltage, which, as will be seen, corresponds to the distance to be indicated.

Reference will now be made to Fig. 6 to explain the operation of the circuit of Fig. 5. Thus, in Fig. 6 are approximately shown the wave shapes 76 and 70 appearing at the outputs of amplifiers 75 and 69, respectively, and impressed on the respective screen grids of mixers 77 and 73. It will be noted that these pulses 76 and 70 overlap by substantially the duration of the desired received pulse 72. It will be clear from what follows that these are desirable but not necessary conditions.

Let it be assumed, for purpose of illustrating the operation, that pulses 76 and 70 have the phases shown in Fig. 6 with respect to the control oscillator wave 35, corresponding to the phase shift shown at 47, obtained by phase shifter 41. Let it be further assumed that the received wave is of the phase and character shown at 72a.

The grid biases on mixers 73 and 77 are chosen so that these tubes are normally completely blocked, and so that impressing pulses 76 or 70 on their screen grids moves their operating points to substantially linear portions of their tube characteristics, so as to condition tubes 73 and 77 to conduct if proper control grid potentials are applied. Therefore, if the received wave is impressed on the control grids of the mixers during the pulses 76 or 70, the corresponding mixer will amplify the portion of the received wave occurring during these pulses. All other portions of the received wave will be blanked out.

Accordingly, with switch 146 in the right position, potentiometer 150 may be adjusted until the desired received pulse is permitted to pass through either mixer 73 or 77, appearing at the corresponding output terminals 262 or 258, the noise and extraneous pulses being thereby "stripped" off. The output from the terminals 262 or 258 may be used to indicate distance on the cathode ray indicator 13 in the manner described above. Alternatively, the voltage appearing on grid 145 of phase shifter 41 may be used to indicate distance, since this voltage is proportional to the phase shift which in turn is proportional to the required distance. If desired, potentiometer 150 may be calibrated directly in terms of distance. There is thus provided a manually operated pulse gate.

For manual operation, it is only necessary to provide one of the channels 69, 73 or 75, 77, the remaining portions of the circuit being unnecessary. However, it is desirable to perform automatic gating as the desired received pulse changes its phase position relative to the output of control oscillator 1, as when the distant object is moving. For this purpose the two time-displaced channels are provided, and the system is adjusted to automatically match the desired received pulse by the overlap of the two time-displaced pulses 70, 76, in the following manner, switch 146 being now placed in the left position.

Assuming the received wave to be as shown in 72a, it will be seen that the desired pulse 72 is at least partially concurrent with pulse 76, but not at all concurrent with pulse 70. Hence, mixer tube 73 will not conduct at all, its plate current being shown at 78a, leaving the voltage across resistor 273 unchanged. However, mixer tube 77 will conduct during the concurrency of the two pulses 76 and 72, producing a plate current as at 74a and increasing the voltage across resistor 259, thereby rendering the grid of amplifier 277 more positive (or, more properly, less negative).

Amplifiers 277 and 275 are selected to be high gain amplifiers, so that the maximum variation of anode potential encountered will be at least as large as, and preferably exceed, the corresponding variation of potential of grid 145 needed to produce the maximum usable phase shift in phase shifter 41. Also, these amplifiers are adjusted to produce zero reading on voltmeter 291 when mixers 73 and 77 are both conducting equally. This adjustment may be made by potentiometer 285. Thus, when mixer 77 alone conducts, thereby rendering the grid of amplifier 277 more positive, this amplifier will increase its plate current, thereby lowering the potential of its anode. At the same time, the increased volt drop thereby produced across biasing resistor 281 will decrease the plate current of amplifier 275 and increase its anode potential. Since grid 145 is directly coupled to this anode, its potential will increase, as shown by curve 80a of Fig. 6, thereby producing a change in the phase shift of pulses 76 and 70, and causing them to move relative to received pulse 72 in a direction to oppose the increase of potential of grid 146; that is, to equalize the conduction of both mixers. An equilibrium condition is reached wherein both mixers partially conduct the received pulse 72.

If the pulse 72 occurs later than the overlap of pulses 76, 70, as shown at 72b, it will be clear that now mixer 73 will conduct, mixer 77 remaining non-conductive, and that the potential of grid 145 will decrease, as shown at 80b, thereby producing a phase shift in the opposite direction from the previous illustration, and properly correcting the gate position.

If the gate is properly positioned, as illustrated at 72c, 74c, 78c and 80c, the potential of grid 145 is automatically at the proper point to maintain the overlap of pulses 70, 76 matched to received pulse 72. Should received pulse 72 change its phase position, as when the distant object changes its distance, the potential on grid 145 will change to cause the gate formed by pulses 70, 76 to follow the received pulse 72. The amplification of amplifiers 275, 277 is great enough so that only a slight unbalance in the output of the mixers 73, 77 will be sufficient to provide more than enough correction in phase shifter 41. By means of this, the received pulse 72 in kept near to and substantially concurrent with the overlap of pulses 70, 76. In this way, the automatic pulse gate is provided.

It will be noted that the amount the gate is shifted in phase represents the required distance to the distant object. Accordingly indicator 33, responsive to the potential on grid 145 controlling this phase shift, may be calibrated to read distance directly, thus eliminating the necessity for cathode ray indicator 13. However, indicator 13, cooperating with scale 29 provides a more sensitive and accurate type of indication, being linear over the entire range of distances measured.

The system just described is perfectly satisfactory in following the received pulse with the gate, but cannot itself place the gate at the proper position to track with the pulse. Thus, if the gate is so far removed in phase from the pulse that both mixers are non-conducting, the phase shifter will automatically keep the gate at a predetermined position, and tracking will be impossible. It is necessary therefore to manually adjust the gate to a position near the desired pulse, whereupon it will automatically fall into position and thereafter track with the pulse. Figs. 5 and 9 show a convenient indicator for assisting in so adjusting the gate.

Thus, in Fig. 5, a tap 293 is made on delay line 265 at the proper point to derive a pulse from pulse 63 having a delay just half that of pulse 67. This pulse is fed through a conventional buffer amplifier 295 (Fig. 9) to the intensity control grid 297 of cathode ray indicator.

Grid 297 is normally maintained at the proper potential as by a suitable power supply similar to 15 of Fig. 1, so as to assure suitable intensity level for the cathode ray trace on the screen of the illustrated cathode ray tube which is preferably the same as screen 28 in Figs. 1–3. However, when a pulse is transmitted to grid 297, this intensity is momentarily increased to form a noticeable bright spot in the trace, at the phase position corresponding to the pulse gate.

In operation, the indicator 13 is placed under the direct control of receiver 11, as by switch 12, which effectively cuts out the pulse gate 23. The indication will now be as in Fig. 2, with the addition of a bright spot in the trace at the phase position of the pulse gate. The gate is then varied in phase by potentiometer 150 (switch 146 being thrown to the right) until the desired received pulse is made bright. This indicates that both the desired received pulse and the pulse gate have the same phase position. The position of the gate is now finely adjusted until voltmeter 303 bridged across switch 146 registers zero. Now switch 146 is thrown to the right, and the gate will thereafter automatically track with the desired received pulse.

Alternatively, with switch 146 in the left position, potentiometer 285 may be adjusted until the resulting change in anode potential of amplifier 275 (and hence of grid 145) moves the gate into correspondence with the received pulse, as shown by the indicating means just described, whereupon thereafter the gate will automatically follow the received pulse.

It will be clear that either pulse 63 or 67 may be used to control the cathode ray beam intensity, as desired, since they will be sufficiently close in time to the desired received pulse to enable the gate to synchronize with it.

Although a particular type of circuit for deriving pulses from the output of phase shifter 41 has been described, it is to be noted that any suitable type of pulse generator may be used.

With manual control of the gate, either meter 33 or potentiometer 150 may be calibrated so that when the desired pulse trace is brightened the corresponding object distance may be read off directly. Meter 33 may also be used with automatic gate control.

From the above, it will be clear that the present invention has provided an automatic pulse gate suitable for general use in any pulse receiving system which will serve to eliminate all harmful effects of received noise and permit the accurate determinations from the received pulse.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a system for receiving a first periodic wave having variable phase recurring pulses, the combination comprising a source of oscillations of the same frequency as the repetition rate of said pulses, means for adjusting the phase of said oscillations, means for deriving a second periodic pulse wave from said phase-adjusted oscillations, means for delaying said second pulse wave by an amount whereby corresponding ones of said derived pulses and said delayed pulses are concurrent and overlap in time for substantially the duration of each of said first pulses, means for controlling said phase-adjusting means in response to lack of phase correspondence between said first pulse and said overlap so as to maintain said correspondence, and means for blocking transmission of said first wave except during one of said derived or delayed pulses.

2. In a system for receiving a first periodic wave comprising variable phase pulses, the combination comprising a source of oscillations of the same frequency as said wave, means for adjusting the phase of said oscillations, means for deriving a second periodic pulse wave from said phase adjusted oscillations, means for delaying said second pulse wave by a predetermined amount, means for controlling said phase adjusting means in response to lack of phase correspondence between said first pulse and said derived and delayed pulses to maintain said correspondence, and means for preventing transmission of said first wave except during one of said derived or delayed pulses.

References Cited in the file of this patent

UNITED STATES PATENTS

| | | |
|---|---|---|
| 1,251,363 | Gherardi | Dec. 25, 1917 |
| 1,742,902 | Deloraine et al. | Jan. 7, 1930 |
| 1,924,174 | Wolf | Aug. 29, 1933 |
| 2,003,780 | Born | June 4, 1935 |
| 2,048,081 | Riggs | July 21, 1936 |
| 2,053,092 | Lemmon | Sept. 1, 1936 |
| 2,055,883 | Terry | Sept. 29, 1936 |
| 2,158,198 | Prescott | May 16, 1939 |
| 2,199,634 | Koch | May 7, 1940 |
| 2,220,183 | Ulbricht | Nov. 5, 1940 |
| 2,225,524 | Percival | Dec. 17, 1940 |
| 2,241,170 | Ulbricht | May 6, 1941 |
| 2,262,838 | Deloraine et al. | Nov. 18, 1941 |
| 2,270,449 | Kahn | Jan. 20, 1942 |
| 2,270,773 | Sonnentag et al. | Jan. 20, 1942 |
| 2,299,390 | Holmes et al. | Oct. 20, 1942 |
| 2,317,334 | Shimek | Apr. 20, 1943 |
| 2,352,634 | Hull | July 4, 1944 |

FOREIGN PATENTS

| | | |
|---|---|---|
| 290,979 | Great Britain | May 18, 1928 |
| 438,568 | Great Britain | Nov. 19, 1935 |
| 460,488 | Great Britain | Jan. 28, 1937 |
| 480,572 | Great Britain | Feb. 24, 1938 |